Sept. 21, 1954   F. R. NISSEL   2,689,379
METHOD OF PRODUCING RIDDLED THERMOPLASTIC SHEETS
Filed April 25, 1951

PERFORATIONS PRODUCED
AT THESE POINTS

INVENTOR
FRANK R. NISSEL
BY
ATTORNEY

Patented Sept. 21, 1954

2,689,379

UNITED STATES PATENT OFFICE 2,689,379

METHOD OF PRODUCING RIDDLED THERMOPLASTIC SHEETS

Frank Ralph Nissel, Plainfield, N. J., assignor to Union Carbide and Carbon Corporation, a corporation of New York Original application September 8, 1949, Serial No. 114,604. Divided and this application April 25, 1951, Serial No. 222,893

10 Claims. (Cl. 18—56)

This invention relates to an improved method of riddling thermoplastic sheet or film to be used for wearing apparel, upholstery and the like and to the fabric-like article so produced.

The principal object of the invention is to provide a thermoplastic resinous sheet or film material with the appearance of a woven fabric and a multitude of small, uniformly spaced perforations throughout which provide ventilation and enhance the woven appearance in transmitted light.

Another object is to provide a riddled thermoplastic sheet or film with smooth, clean-cut edges on the perforations therein and, where desirable, with perforations of a size sufficient to permit the ready passage of air but insufficient to permit the ready passage of water.

A further object is to provide an improved process for riddling thermoplastic material whereby said material will possess the characteristics hereinbefore described.

Thermoplastic resins, such as the polymers and copolymers of vinyl derivatives (e. g. "Vinylite", a copolymer of vinyl chloride-vinyl acetate), have been used to replace cotton, wool, leather, and the like in wearing apparel and upholstery fabrics, often with resulting advantages in appearance, durability, and other desirable characteristics. These thermoplastic resinous materials have the disadvantage, however, of being unable to "breathe," i. e. they are almost completely impervious to air and water vapor, and for some purposes are thereby rendered less comfortable to the wearer or user than woven fabrics or leather.

It has previously been proposed to riddle thermoplastic film or sheet solely by mechanical perforation, e. g. by piercing the material with a sharp pointed object. Mechanical perforation of this nature leaves jagged edges around the perforations which have a tendency to subsequently block the opening and destroy the ventilating effect. It has also been proposed to perforate thermoplastic resinous material by discharging an electric arc therethrough. Such electro-perforation is limited in the perforation density obtainable because of the tendency of the arc to "short-circuit" through any nearby hole. Neither of these methods aids the appearance of the treated material and any subsequent embossing thereof greatly reduces the ventilating effect by filling up many of the perforations.

I have discovered that by heating the thermoplastic resinous material to a temperature above its softening point and exerting sufficient pressure thereon with a metal screen, or a hard surface engraved with a screen pattern, I can produce a riddled film or sheet with as many as 3600 perforations per square inch. Simultaneously with the perforation thereof, the screen pattern is embossed on the surface of the film or sheet, giving it a woven appearance in either reflected or transmitted light. The perforations are evenly spaced throughout the pattern, being formed by the evenly spaced intersections of the wire, and are substantially uniform in size. As the thermoplastic material has been forced out of the perforated area while at a temperature above its softening point, the edges of the perforations are fused and smooth. No jagged edges remain to block the perforation and reduce the ventilating effect. In addition, where other than the coarsest screen is used the fabric has an improved "hand" i. e. it no longer possesses the "cold" smooth feeling characteristic of the untreated materials of this type.

The purpose for which thermoplastic material treated according to the process of the invention is to be used will determine the mesh per inch and wire diameter of the screen to be employed. This may be determined easily by a simple test on a sample of the material to be treated. To create the appearance of a particular cloth, one need only select a screen with an interstice approximately equal to the thread diameter of that fabric. If coarser materials, such as those of the woven reed type, are to be simulated, a screen with a small number of meshes per inch, wherein the wire diameter is only a fraction of the interstice width, should be employed. By employing single-crimped screen in place of double-crimped screen of identical mesh, the same fabric-like appearance may be achieved with approximately one-half the perforation density, as the straight wires in single-crimped screen emboss the material without perforating it. Thus, it is apparent that many and varied effects can be achieved in practicing my invention by varying the meshes per inch, wire diameter, and crimp of the screen employed.

For many uses, e. g. in making raincoats, it is desirable that the riddled material be impervious to water. It has been determined that perforations of 0.002 inch diameter or less will prevent the passage of water not under substantial pressure. The screen which produces a perforation of 0.002 inch diameter when employed in the practice of this invention will vary somewhat with the thickness of the thermoplastic material and the diameter of the wire used. For example, with thermoplastic film up to 0.012 inch thick, standard wire screen of from 60 to 20 meshes per inch of wire 0.006 to 0.015 inch in diameter will produce that size hole. With thermoplastic sheeting of from 0.012 to 0.020 inch thick, wire screen of from 25 to 10 meshes of wire 0.010 to 0.030 inch in diameter will produce a 0.002 inch diameter hole. Increased material thickness requires increased screen wire diameter to produce a perforation of a given dimension under otherwise similar conditions. The wire diameter must always be at least one half the thickness of the thermoplastic to be riddled, thereby enabling the intersecting wires of the screen to completely penetrate the material.

A riddled thermoplastic film material of a thickness up to 0.012 inch with a cloth-like appearance may be made by employing screen from approximately 60 to 20 meshes per inch of wire 0.006 to 0.015 inch in diameter. With slightly plasticized or unplasticized thermoplastic sheeting, even coarser screen may be used. For example, 0.020 inch thick sheeting when riddled with 20 meshes per inch screen of wire 0.022 inch in diameter has the appearance of woven reed material such as is used for automobile seat covers and the like. The maximum screen mesh which produces the desired ventilating effect and appearance with thermoplastic sheeting is about a 25 meshes per inch screen of wire 0.018 inch in diameter. The minimum screen mesh producing the effect is about 4 meshes per inch screen from wire 0.030 inch in diameter. This range is valid for sheeting from 0.012 to 0.020 inch thick. Where screen of less than 10 mesh per inch is employed, the riddled material, while well ventilated and embossed will not prevent water from passing therethrough.

A thermoplastic film 0.004 inch thick when embossed and riddled by my process with a 50 meshes per inch screen had a moisture transmission of 1031 grams/day/square meter. Similar film when riddled by an electric discharge process had a moisture transmission of 148 grams/day/square meter. The moisture transmission was determined as follows: The riddled material to be tested was fastened in a relaxed condition over the mouth of an 80 mm. diameter, 40 mm. deep beaker containing 11 grams of calcium chloride. The beaker was weighed and placed in an atmosphere with a relative humidity of 100% (General Foods Humidity Cabinet) for 96 hours at 100° F. The beaker and sample of material were then reweighed and the moisture transmission calculated.

This invention may be practiced as a unit process or a continuous process. In the accompanying drawings.

Figure 1:
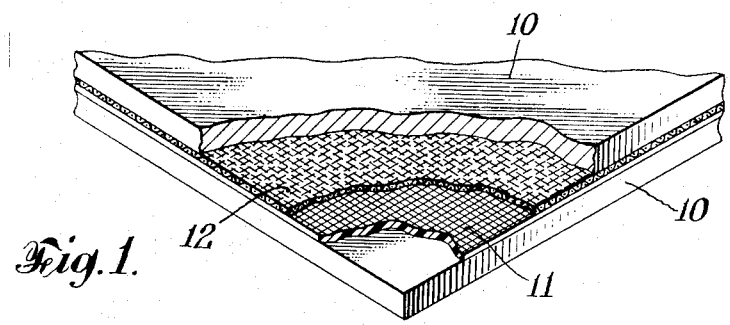
Fig. 1 is a perspective view of the apparatus used in a unit process.
Figure 4:
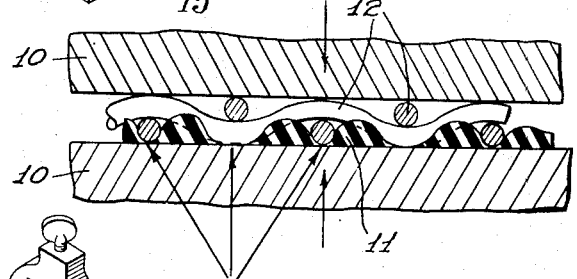
Figure 3:
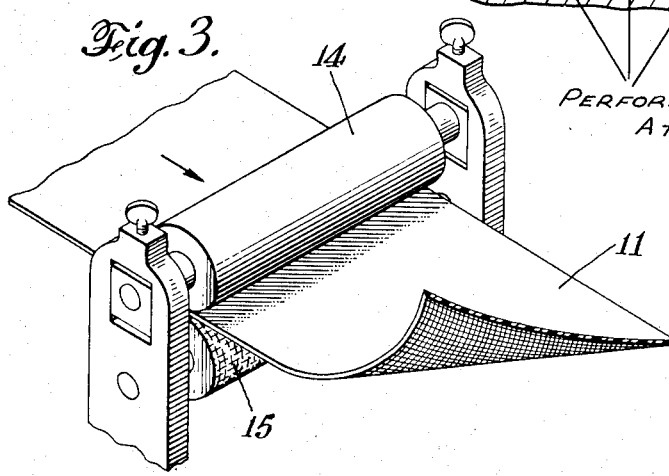

Fig. 3 is a perspective view of the apparatus used in a continuous process employing my invention; and Fig. 4 is an enlarged partial cross-sectional view of Fig. 1 showing a plastic sheet 11 perforated in areas adjacent to the interstices of the wires in the woven screen 12 which has been pressed into the plastic sheet by means of the opposed platens 10.

The material perforated and embossed in accordance with my invention has one smooth surface and one surface with the appearance of a woven fabric. As the minute perforations are only readily visible in transmitted light they are not represented in the drawings.

Figure 2:
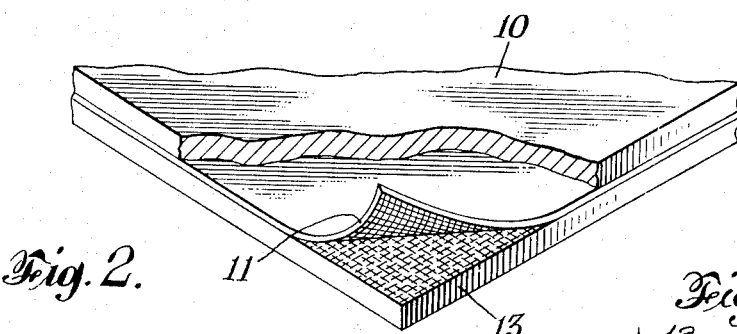
Fig. 2 is a perspective view of a modification of Fig. 1 wherein one plate, engraved with a screen design, is substituted for the screen and one plate shown in Fig. 1.

In practice, one or both of the press plates 10 are heated to a temperature above the softening point of the thermoplastic material 11. Pressure is then applied to the plates 10 forcing the screen 12 to simultaneously emboss and riddle the material 11. The plates are then cooled and the ventilated material is stripped from the screen. As shown in Fig. 2, an engraved plate 13 may be substituted for the screen 12 and one plate 10 of Fig. 1.

In continuous operation, the thermoplastic material is preheated to above its softening point and fed between the smooth backing roll 14 and the screen engraved roll 15. These rolls may be left to find their own temperature but it is preferable that they be cooled somewhat by any known means in order to assist in reducing the temperature of the riddled material below its softening point as soon as possible after the riddling operation.

The following examples are illustrative of the practice of the invention but are not to be construed as limiting the scope thereof.

*Example I*

Thermoplastic material _____ Film of vinyl chloride-vinyl-acetate copolymer
Material thickness (inches) ____ .004
Temperature (° C.) _____ 165
Pressure (lbs./sq. inch) _____ 600
Perforations (per sq. inch) ___ 2500
Perforation diameter (inches) _ .002
Moisture transmission (grams/day/sq. meter) _____ 1031

*Example II*

Thermoplastic material_____ Sheeting of vinyl chloride - vinyl acetate copolymer
Material thickness (inches) ___ .020
Temperature (° C.) _____ 160
Pressure (lbs./sq. inch) _____ 600
Perforations (per sq. inch) ___ 400
Perforation diameter (inches) .003
Moisture transmission (grams/day/sq. meter) ____ 291

This is a divisional application of my copending application, Serial No. 114,604, filed September 8, 1949, now abandoned.

I claim:

1. Method of perforating and imparting a woven fabric appearance to thermoplastic film or sheet material, which comprises heating the thermoplastic film or sheet material to above its softening temperature, positioning the heated material between a smooth backing surface and an embossing means having a woven wire pattern in which pattern the wire diameter is at least half the thickness of the thermoplastic material, applying sufficient pressure for the wire pattern to be embossed on the thermoplastic material and to perforate through the thermoplastic material at all the wire intersections in the woven pattern surface, and then stripping the perforated and embossed material from the pattern.

2. Method of perforating and imparting a woven fabric appearance to thermoplastic resinous material which comprises heating said material in sheet or film form to a temperature above its softening point, pressing said material between a smooth backing plate and a woven wire screen of from 60 to 4 meshes per inch, the diameter of said wire being at least half the thickness of the thermoplastic sheet or film, at a pressure sufficient to cause said screen to perforate said material at each intersection of the wires of said screen, cooling said material to below its softening point and stripping it from the screen.

3. Method of perforating and imparting a woven fabric appearance to thermoplastic resinous film material of less than 0.012 inch thickness which comprises heating said material to a temperature above its softening point, pressing said material between a smooth backing plate and a woven wire screen of from 60 to 20 meshes per inch, the diameter of said wire being at least half the thickness of said film material, at a pressure sufficient to cause said screen to perforate said material at each intersection of the wires of said screen, cooling said material to below its softening point and stripping it from the screen.

4. Method of perforating and imparting a woven fabric appearance to thermoplastic resinous sheet material of from 0.012 to 0.050 inch thickness which comprises heating said material to a temperature above its softening point, pressing said material between a smooth backing plate and a woven wire screen of from 25 to 4 meshes per inch and having a wire diameter at least half the thickness of the sheet material, at a pressure sufficient to cause said screen to perforate said material at each intersection of the wires of said screen, cooling said material to below its softening point and stripping it from the screen.

5. Method of perforating and imparting a woven fabric appearance to thermoplastic resinous material which comprises heating said material in sheet or film form to a temperature above its softening point, applying pressure to said material by means of a smooth backing plate and an engraved facing plate, said facing plate being configurated as a woven wire screen of from 60 to 4 meshes per inch and having a wire diameter at least half the thickness of said sheet or film, and said pressure being sufficient to cause said screen configuration to perforate said material at each intersection of said screen configuration, cooling said material to below its softening point and stripping it from the screen pattern.

6. Method of perforating and imparting a woven fabric appearance to thermoplastic resinous film material of less than 0.012 inch thickness which comprises heating said material to a temperature above its softening point, applying pressure to said material by means of a smooth backing plate and an engraved facing plate, said facing plate being configurated as a woven wire screen of from 60 to 20 meshes per inch and with a wire diameter of at least half the thickness of the film, and said pressure being sufficient to cause said screen configuration to perforate said material at each intersection of said screen configuration, cooling said material to below its softening point and stripping it from the screen pattern.

7. Method of perforating and imparting a woven fabric appearance to thermoplastic resinous sheet material of from 0.012 to 0.050 inch thickness which comprises heating said material to a temperature above its softening point, applying pressure to said material by means of a smooth backing plate and an engraved facing plate, said facing plate being configurated as a woven wire screen of from 25 to 4 meshes per inch and with the wire diameter being at least half the thickness of the sheet material, and said pressure being sufficient to cause said screen configuration to perforate said material at each intersection of said screen configuration, cooling said material to below its softening point and stripping it from the screen pattern.

8. Method of perforating and imparting a woven fabric appearance to thermoplastic resinous material which comprises heating said material in sheet or film form to a temperature above its softening point, pressing said material between a hard backing roll and an engraved facing roll, said facing roll being configurated as a woven wire screen of from 60 to 4 meshes per inch and with the wire diameter being at least half the thickness of said sheet or film, and said pressure being sufficient to cause said screen configuration to perforate said material at each intersection of said screen configuration, and continuously stripping said material from said facing roll.

9. Method of perforating and imparting a woven fabric appearance to thermoplastic resinous film material of up to 0.012 inch thickness which comprises heating said material to a temperature above its softening point, pressing said material between a hard backing roll and an engraved facing roll, said facing roll being configurated as a woven wire screen of from 60 to 20 meshes per inch and with a wire diameter at least half the thickness of said film material, and said pressure being sufficient to cause said screen configuration to perforate said material at each intersection of said screen configuration, and continuously stripping said material from said facing roll.

10. The process of riddling thermoplastic resinous sheet material of from 0.012 to 0.050 inch thickness which comprises heating said material to a temperature above its softening point, pressing said material between a hard backing roll and an engraved facing roll, said facing roll being configurated as a woven wire screen of from 25 to 4 meshes per inch and with a wire diameter at least half the thickness of the thermoplastic sheet material, and said pressure being sufficient to cause said screen configuration to perforate said material at each intersection of said screen configuration, and continuously stripping said material from said facing roll.

References Cited in the file of this patent

UNITED STATES PATENTS

| Number | Name | Date |
| --- | --- | --- |
| 2,032,935 | Hurt | Mar. 3, 1936 |
| 2,032,941 | Linscott | Mar. 3, 1936 |
| 2,070,023 | Olsen | Feb. 9, 1937 |
| 2,446,771 | Knowland | Aug. 10, 1948 |